United States Patent
Tong et al.

(10) Patent No.: US 9,228,161 B2
(45) Date of Patent: Jan. 5, 2016

(54) UNDERCOAT LAYER AND IMAGING MEMBERS COMPRISING SAME

(71) Applicant: Xerox Corporation, Norwalk, CT (US)

(72) Inventors: Yuhua Tong, Hockessin, DE (US); Jin Wu, Pittsford, NY (US); Robert P. Altavela, Webster, NY (US); Edward F. Grabowski, Webster, NY (US); Kent J. Evans, Lima, NY (US); Adilson P. Ramos, Bahia (BR); Nancy L. Belknap, Rochester, NY (US); Helen R. Cherniack, Rochester, NY (US)

(73) Assignee: XEROX CORPORATION, Norwalk, CT (US)

(*) Notice: Subject to any disclaimer, the term of this patent is extended or adjusted under 35 U.S.C. 154(b) by 17 days.

(21) Appl. No.: 14/329,785

(22) Filed: Jul. 11, 2014

(65) Prior Publication Data

US 2014/0323377 A1 Oct. 30, 2014

Related U.S. Application Data

(62) Division of application No. 12/640,255, filed on Dec. 17, 2009, now abandoned.

(51) Int. Cl.
*B23P 17/00* (2006.01)
*B23P 19/04* (2006.01)
*G03G 15/04* (2006.01)
*C11D 7/50* (2006.01)
*B09B 5/00* (2006.01)
*G03G 5/10* (2006.01)
*G03G 5/14* (2006.01)

(52) U.S. Cl.
CPC .............. *C11D 7/5004* (2013.01); *B09B 5/00* (2013.01); *G03G 5/102* (2013.01); *G03G 5/142* (2013.01); *G03G 5/144* (2013.01)

(58) Field of Classification Search
CPC ........... B09B 5/00; G03G 5/144; G03G 5/102
USPC ...................... 430/60, 65; 29/403.3
See application file for complete search history.

(56) References Cited

U.S. PATENT DOCUMENTS

| | | | |
|---|---|---|---|
| 4,265,990 A | 5/1981 | Stolka et al. |
| 4,921,769 A | 5/1990 | Yuh et al. |
| 5,346,556 A | 9/1994 | Perry et al. |
| 5,958,638 A | 9/1999 | Katayama et al. |
| 6,132,912 A | 10/2000 | Fuller et al. |
| 6,165,660 A | 12/2000 | Chambers et al. |
| 6,287,737 B1 | 9/2001 | Ong et al. |
| 6,444,386 B1 | 9/2002 | Liu et al. |
| 2004/0202947 A1 | 10/2004 | Wu et al. |
| 2009/0197191 A1 | 8/2009 | Kim et al. |

*Primary Examiner* — Gregory R Delcotto
(74) *Attorney, Agent, or Firm* — Fay Sharpe LLP

(57) ABSTRACT

Disclosed are undercoat layers comprising a metal oxide, a polymer, and a citrate of Formula (I):

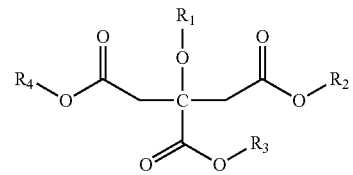

Formula (I)

wherein $R_1$ is H, alkyl, or COR'; wherein R' is alkyl; and wherein $R_2$, $R_3$, and $R_4$ are independently alkyl. The undercoat layers are useful in imaging members because they are easily separated from the substrate. This reduces the number of steps necessary to reclaim the substrate.

17 Claims, 1 Drawing Sheet

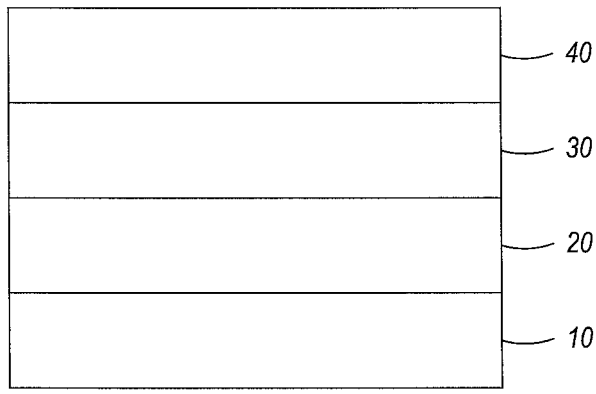

UNDERCOAT LAYER AND IMAGING MEMBERS COMPRISING SAME

CROSS-REFERENCE TO RELATED APPLICATIONS

This application is a divisional of U.S. patent application Ser. No. 12/640,255, filed Dec. 17, 2009, now abandoned. This application is hereby incorporated by reference in its entirety herein.

BACKGROUND

Disclosed herein, in various embodiments, are undercoat layers useful in various imaging members and the imaging members themselves. Among other things, the undercoat layers can be readily removed, allowing the substrate to be more easily recycled.

Electrophotographic imaging members, i.e. photoreceptors, typically include a photoconductive layer formed on an electrically conductive substrate. The photoconductive layer is an insulator in the dark so that electric charges can be retained on its surface. Upon exposure to light, the charge is dissipated.

An electrostatic latent image is formed on the photoreceptor by first uniformly depositing an electric charge over the surface of the photoconductive layer by one of the many known means in the art. The photoconductive layer functions as a charge storage capacitor with charge on its free surface and an equal charge of opposite polarity on the conductive substrate. A light image is then projected onto the photoconductive layer. The portions of the layer that are not exposed to light retain their surface charge. After development of the latent image with toner particles to form a toner image, the toner image is usually transferred to a receiving substrate, such as paper.

A photoconductive imaging member may comprise a supporting substrate, an optional electrically conductive layer, an optional adhesive layer, a charge generating layer, a charge transport layer, and an optional protective or overcoat layer. One or more of these layers may also be combined or added to other layers to form the imaging member.

Conventional electrophotographic imaging members may also comprise an undercoat layer located between the substrate and charge generating layer. Some examples of conventional undercoat layers can be seen in U.S. Pat. Nos. 4,265,990, 4,921,769, 5,958,638, 6,132,912, 6,287,737, and 6,444,386, the disclosures of which are incorporated herein by reference in their entireties. In particular, such undercoat layers may be applied directly on the substrate.

Undercoat layers are desirable because they extend the functional lifetime for photoreceptors and enable the use of less expensive substrates. They may also assist in the adhesion of the photosensitive layers to the substrate. Undercoat layers also prevent foreign materials such as carbon fiber penetration into photoreceptors thus preventing "color spots."

It may be desirable to recycle the substrate at the end of an imaging member's service life. However, the various layers deposited on the substrate of the imaging member must be removed before the substrate can be reused or sold. The process for removing these layers, known as substrate reclamation, is an expensive and somewhat time-consuming process. An example of a substrate reclamation process which includes lathing and cleaning photoreceptor substrates is disclosed in U.S. Pat. No. 5,346,556.

It would be desirable to develop an undercoat layer that allows for easy removal of the coating layers on the substrate without sacrificing performance of the electrophotographic imaging member.

BRIEF DESCRIPTION

The present application discloses, in various embodiments, undercoat layers comprising a metal oxide, a polymer, and a citrate. Imaging members, particularly photoconductors or photoconductive imaging members, which comprise the undercoat layers are also disclosed. These undercoat layers simplify the process of substrate reclamation without affecting the electrical properties of the imaging member.

In embodiments, an imaging member is disclosed which comprises an undercoat layer. The undercoat layer comprises a metal oxide; a polymer; and a citrate of Formula (I):

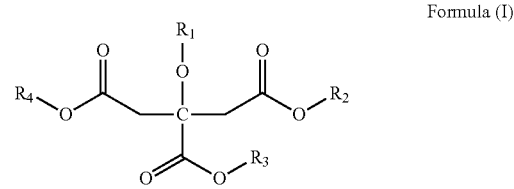

Formula (I)

wherein $R_1$ is H, alkyl, or COR'; wherein R' is alkyl; and wherein $R_2$, $R_3$, and $R_4$ are independently alkyl.

The metal oxide may be a titanium oxide, particularly titanium dioxide or zinc oxide.

The citrate may be acetyl tributyl citrate represented by Formula (II):

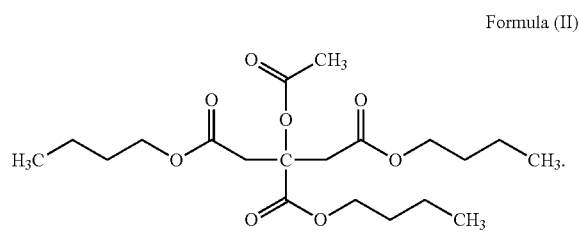 [SMILES: CCCCOC(=O)CC(CC(=O)OCCCC)(OC(C)=O)C(=O)OCCCC]

Formula (II)

Alternatively, the citrate may be tri(n-butyl) citrate represented by Formula (III):

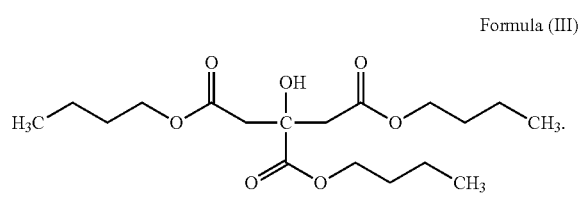 [SMILES: CCCCOC(=O)CC(O)(CC(=O)OCCCC)C(=O)OCCCC]

Formula (III)

The polymer may be selected from the group consisting of a phenolic resin, a melamine resin, an epoxy resin, a polyamide resin, a polyvinyl butyral resin, a polyurethane resin, a poly(vinyl carbazole), an organosilane, nylon, polyesters, polyvinylidene chloride resin, silicone resins, fluorocarbon resins, polycarbonates, polyacrylates and methacrylates, copolymers of vinyl chloride and vinyl acetate, phenoxy resins, poly(vinyl alcohol), polyacrylonitrile, polystyrene, poly(vinylbenzyl alcohol), poly(2-hydroxyethyl methacrylate), poly(2-hydroxyethyl acrylate), poly(3-hydroxypropyl methacrylate), and mixtures thereof. In specific embodiments, the polymer is a phenolic resin.

In some specific embodiments, the metal oxide is titanium dioxide, the polymer is a phenolic resin, and the citrate is acetyl tributyl citrate represented by Formula (II):

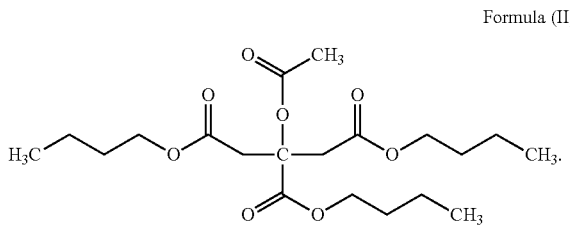

Formula (II)

In other specific embodiments, the metal oxide is titanium dioxide, the polymer is a phenolic resin, and the citrate is tri(n-butyl) citrate represented by Formula (III):

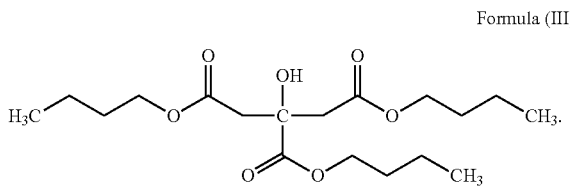

Formula (III)

In still other embodiments is disclosed an imaging member comprising, in sequentially formed layers: a substrate; an undercoat layer; and a photosensitive layer. The photosensitive layer may include a charge generating layer and a charge transport layer. The undercoat layer is formed from a dispersion comprising a metal oxide, a polymer, and a citrate of Formula (I):

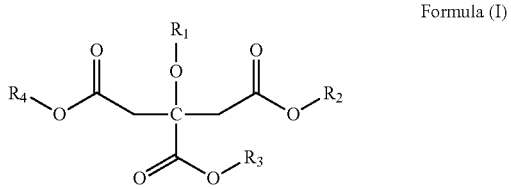

Formula (I)

wherein $R_1$ is H, alkyl, or COR'; wherein R' is alkyl; and wherein $R_2$, $R_3$, and $R_4$ are independently alkyl.

The citrate may comprise from about 2 to about 10 weight percent of the undercoat layer.

Also disclosed in embodiments are methods for reclaiming a substrate from an imaging member. An imaging member is provided which comprises a substrate and an undercoat layer, the undercoat layer comprising a metal oxide, a polymer, and a citrate of Formula (I):

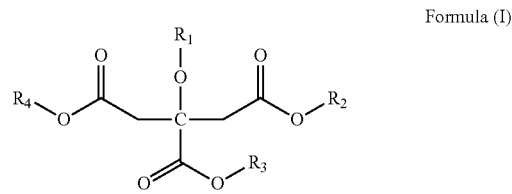

Formula (I)

wherein $R_1$ is H, alkyl, or COR'; wherein R' is alkyl; and wherein $R_2$, $R_3$, and $R_4$ are independently alkyl. The imaging member is immersed in a stripping solution to separate the undercoat layer from the substrate.

The stripping solution may comprise a solvent selected from the group consisting of N-methylpyrrolidone, ethanol, dimethylsulfoxide, N,N'-dimethylformamide, N,N'-dimethylacetamide, and the like and mixtures thereof.

The stripping solution may also comprise an acid selected from the group consisting of citric acid, acetic acid, nitric acid, oxalic acid, phosphoric acid, hydrochloric acid, sulfuric acid, and the like and mixtures thereof.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 illustrates an exemplary embodiment of an imaging member fabricated according to the present disclosure.

DETAILED DESCRIPTION

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range of "from about 2 to about 10" also discloses the range "from 2 to 10."

The present disclosure relates to undercoat layers that are useful in making coatings easier and cheaper to remove during substrate reclamation. The undercoat layers comprise a metal oxide, a polymer, and a citrate. The metal oxide and the citrate may be dissolved or dispersed in the polymer.

In FIG. 1, an imaging member is shown that has an undercoat layer 20, a charge generating layer 30, and a charge transport layer 40 disposed on an electrically conductive substrate 10. One of ordinary skill understands that there may be additional layers in the imaging member. An optional adhesive layer may be applied between the undercoat layer and the charge generating layer. An optional ground strip layer may operatively connect the charge generating layer and the charge transport layer to the substrate. An opposite anti-curl back layer may be applied to the side of the substrate opposite from the electrically active layers. An optional overcoat layer may be placed upon the charge transport layer. In particular embodiments, the undercoat layer directly contacts the substrate. The undercoat layer 20 comprises a metal oxide, a polymer, and a citrate.

The metal oxide may generally be any conductive metal which can be oxidized. In particular embodiments, the metal may be titanium (Ti), tin (Sn), zinc (Zn), indium (In), silicon (Si), aluminum (Al), zirconium (Zr), or molybdenum (Mb). In specific embodiments, the metal oxide is titanium dioxide ($TiO_2$) or zinc oxide (ZnO).

In embodiments, the metal oxide (like $TiO_2$) used in the undercoat layer can be either surface treated or untreated. Surface treatments include, but are not limited to, mixing the metal oxide with aluminum laurate, alumina, zirconia, silica, silane, methicone, dimethicone, sodium metaphosphate, and the like, and mixtures thereof. Commercially available examples of $TiO_2$ include MT-150W™ (surface treatment with sodium metaphosphate, available from Tayca Corporation), STR-60N™ (no surface treatment, available from Sakai Chemical Industry Co., Ltd.), FTL-100™ (no surface treatment, available from Ishihara Sangyo Laisha, Ltd.), STR-60™ (surface treatment with $Al_2O_3$, available from Sakai Chemical Industry Co., Ltd.), TTO-55N™ (no surface treatment, available from Ishihara Sangyo Laisha, Ltd.), TTO-55A™ (surface treatment with $Al_2O_3$, available from Ishihara Sangyo Laisha, Ltd.), MT-150AW™ (no surface treatment, available from Tayca Corporation), MT-150A™ (no surface treatment, available from Tayca Corporation), MT-100S™ (surface treatment with aluminum laurate and alumina, available from Tayca Corporation), MT-100HD™ (surface treatment with zirconia and alumina, available from Tayca Corporation), MT-100SA™ (surface treatment with silica and alumina, available from Tayca Corporation), and the like.

The metal oxide may be present in suitable amounts, such as for example, from about 5 to about 80 weight percent, and more specifically, from about 30 to about 70 weight percent, of the undercoat layer. In embodiments, the metal oxide has a diameter of from about 5 to about 300 nanometers. More specifically, the metal oxide may possess a primary particle size diameter of from about 10 to about 25 nanometers, and yet more specifically, about 15 nanometers with an aspect ratio (i.e. ratio of longest axis to shortest axis) of from about 4 to about 5. The metal oxide may optionally be surface treated with a component containing from about 1 to about 3 percent by weight of alkali metal, such as a sodium metaphosphate.

The polymer may be a binder resin such as a thermosetting or thermoplastic resin. The polymer is, in embodiments, a phenolic resin, a melamine resin, an epoxy resin, a polyamide resin, a polyvinyl butyral resin, a polyurethane resin, a poly(vinyl carbazole), an organosilane, nylon, polyesters, polyvinylidene chloride resin, silicone resins, fluorocarbon resins, polycarbonates, polyacrylates and methacrylates, copolymers of vinyl chloride and vinyl acetate, phenoxy resins, poly(vinyl alcohol), polyacrylonitrile, polystyrene, poly(vinylbenzyl alcohol), poly(2-hydroxyethyl methacrylate), poly(2-hydroxyethyl acrylate), poly(3-hydroxypropyl methacrylate), or mixtures thereof. In specific embodiments, the polymer is a phenolic resin. The polymer may comprise from about 20 to about 95 weight percent of the undercoat layer, including from about 30 to about 70 weight percent.

A phenolic resin is generally formed as the condensation product of an aldehyde with a phenol source in the presence of an acidic or basic catalyst.

The phenol source can be, for example, phenol; alkyl-substituted phenols such as cresols and xylenols; halogen-substituted phenols such as chlorophenol; polyhydric phenols such as resorcinol or pyrocatechol; polycyclic phenols such as naphthol and bisphenol A; aryl-substituted phenols, cycloalkyl-substituted phenols, aryloxy-substituted phenols, and combinations thereof. Exemplary phenol sources include 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol, multiple ring phenols, such as bisphenol A, and combinations thereof.

The aldehyde used to make the phenolic resin can be, for example, formaldehyde, paraformaldehyde, acetaldehyde, butyraldehyde, paraldehyde, glyoxal, furfuraldehyde, propinonaldehyde, benzaldehyde, and combinations thereof. In various embodiments, the aldehyde can be formaldehyde.

Phenolic resins include dicyclopentadiene type phenolic resins, phenol novolak resins, cresol novolak resins, phenol aralkyl resins, and combinations thereof. Exemplary phenolic resins include formaldehyde polymers with phenol, p-tert-butylphenol, and cresol, such as VARCUM™ 29159 and 29101 (OxyChem Co.) and DURITE™ 97 (Borden Chemical); formaldehyde polymers with ammonia, cresol, and phenol, such as VARCUM™ 29112 (OxyChem Co.); formaldehyde polymers with 4,4'-(1-methylethylidene)bisphenol such as VARCUM™ 29108 and 29116 (OxyChem Co.); formaldehyde polymers with cresol and phenol such as VARCUM™ 29457 (OxyChem Co.), DURITE™ SD-423A, SD-422A (Borden Chemical); or formaldehyde polymers with phenol and p-tert-butylphenol such as DURITE™ ESD 556C (Borden Chemical).

In embodiments, the phenolic resins are base-catalyzed phenol formaldehyde resins that are generated with a formaldehyde/phenol mole ratio of equal to or greater than one, for example, from about 1 to about 2; or from about 1.2 to about 1.8; or about 1.5. The base catalyst, such as an amine, is generally miscible with the phenol resin.

The citrate is a citrate of Formula (I):

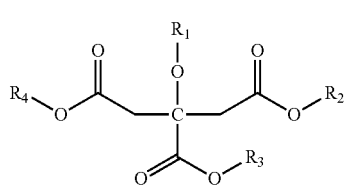

Formula (I)

wherein $R_1$ is H, alkyl, or COR', wherein R' is alkyl; and $R_2$, $R_3$, and $R_4$ are independently alkyl. The term "alkyl" refers to a radical composed entirely of carbon atoms and hydrogen atoms which is fully saturated and of the formula $-C_nH_{2n+1}$. The term "alkyl" should be considered to include both linear and branched chains. Generally, the alkyl chains of the citrate may have from 1 to about 20 carbon atoms. In some embodiments, $R_2$, $R_3$, and $R_4$ are independently $C_1$-$C_6$ alkyl. In specific embodiments, $R_2$, $R_3$, and $R_4$ are the same. In further specific embodiments, $R_2$, $R_3$, and $R_4$ are n-butyl. In other embodiments, $R_1$ is acetyl (—CO—$CH_3$).

In specific embodiments, the citrate may be selected from the group consisting of acetyl tributyl citrate shown in Formula (II) and tri(n-butyl) citrate shown in Formula (III):

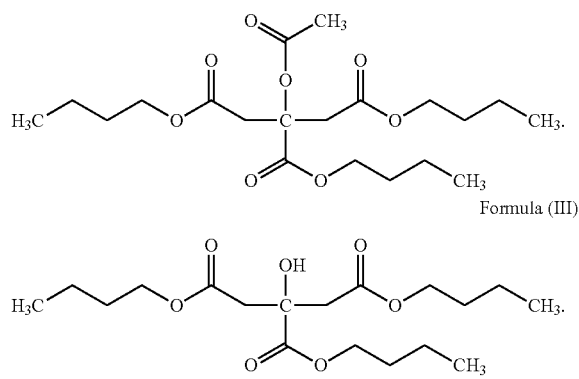

Formula (II)

Formula (III)

Other exemplary citrates that may be included in the undercoat layer are triethyl citrate, triethyl acetylcitrate, tri-2-ethylhexyl acetylcitrate, n-octyldecyl acetylcitrate, and the like and mixtures thereof.

In particular embodiments, the citrate comprises from about 0.1 to about 30 weight percent of the undercoat layer. In more specific embodiments, the citrate comprises from about 1 to about 20 weight percent or from about 2 to about 10 percent by weight of the undercoat layer.

The undercoat layer thickness can be of any suitable value, such as for example, from about 0.1 to about 30 microns, from about 1 to about 20 microns, or from about 3 to about 15 microns.

The undercoat layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the undercoat layer is preferably applied in the form of a dilute solution, with the solvent being removed after deposition of the coating by conventional techniques such as by vacuum, heating and the like. The undercoat layer may be dried at a temperature of from about 40 to about 200° C. for a suitable period of time, such as from about 1 minute to about 10 hours, under stationary conditions or in an air flow.

Generally, citrates are soluble in solvents such as xylene, 1-butanol, methyl ethyl ketone, tetrahydrofuran, 1-methoxy-2-propanol, and the like and mixtures thereof. For example, they are soluble in a solvent mixture of 50% xylene and 50% 1-butanol. Appropriate solvent mixtures can be used to form a dispersion of the metal oxide, phenolic resin, and citrate. The order in which these three ingredients is added to the dispersion is not important. The dispersion is then applied and the solvent evaporated to form the undercoat layer. The undercoat layer may be useful, for example, as a charge blocking layer.

It has been found that the incorporation of a citrate into the undercoat layer enhances removal of coating layers from a substrate. In particular, because the undercoat layer directly contacts the substrate or the conductive layer on top of the substrate, simply removing the undercoat layer removes the other layers of the imaging member from the substrate as well. Thus, the layers can be removed with a mild solution stripping process without the need for a pre-lathing step to remove the layers on top of the undercoat layer. Photo-induced discharge, cyclic stability, background, ghosting, and adhesion properties are either comparable or better in imaging members manufactured in accordance with the present disclosure.

Methods for removing layers of an imaging member from a substrate are contemplated. In particular, substrate reclamation is easier for an imaging member comprising a substrate and an undercoat layer that comprises a metal oxide, a polymer, and a citrate. The methods comprise immersing the imaging member in a stripping solution. The stripping solution comprises a solvent, an acid, and water. The immersion separates the undercoat layer, and the other layers on top of the undercoat layer, from the substrate. In some embodiments, the imaging member needs to be immersed for as little as 5 minutes or even 3 minutes to remove all residue from the substrate.

The solvent used in the stripping solution may comprise N-methylpyrrolidone, ethanol, dimethylsulfoxide, N,N'-dimethylformamide, N,N'-dimethylacetamide, similar solvents, and mixtures thereof. The stripping solution may comprise an acid selected from the group consisting of citric acid, acetic acid, nitric acid, oxalic acid, phosphoric acid, hydrochloric acid, sulfuric acid, similar acids, and mixtures thereof. In some embodiments, the acid is citric acid. In a specific embodiment, the solution comprises 80 wt % N-methylpyrrolidone, 8 wt % citric acid, and 12 wt % water.

In particular embodiments, the undercoat layer is free of zirconium-containing compounds.

Without being limited by theory, it appears that the citrate is physically dispersed in the undercoat layer and does not interact chemically with the polymer or the metal oxide. As a result, the undercoat layer swells, allowing the undercoat layer to be removed more easily. The adhesion between the undercoat layer and the substrate is a little weakened to an extent that it facilitates layer removal by the solution stripping process but is still satisfactory for imaging member performance. The citrate will not form a chelate with the metal oxide.

U.S. Patent Publication No. 2009/0197191 describes an undercoat layer containing dialkylcitrate-chelated zirconate. There, the dialkylcitrate-chelated zirconate can chemically interact (i.e. crosslink) with a functional group such as a hydroxyl group or carboxyl group included in the binder resin and metal oxide particles, and thus prevents agglomeration or gelation of the metal oxide particles. In other words, the dialkylcitrate-chelated zirconate acts as a dispersant. In addition, the crosslinking can strengthen the adhesion between the undercoat layer and the substrate. However, the dialkylcitrate-chelated zirconate does not allow the undercoat layer to be more easily removed from the substrate.

The charge transport layer 40 of FIG. 1 comprises charge transport materials which are capable of supporting the injection of photogenerated holes or electrons from the charge generating layer 30 and allowing their transport through the charge transport layer to selectively discharge the surface charge on the imaging member surface. The charge transport layer, in conjunction with the charge generating layer, should also be an insulator to the extent that an electrostatic charge placed on the charge transport layer is not conducted in the absence of illumination. It should also exhibit negligible, if any, discharge when exposed to a wavelength of light useful in xerography, e.g., about 4000 Angstroms to about 9000 Angstroms. This ensures that when the imaging member is exposed, most of the incident radiation is used in the charge generating layer beneath it to efficiently produce photogenerated charges.

The charge transport materials may include triarylamines such as TPD, tri-p-tolylamine, 1,1-bis(4-di-p-tolylaminophenyl)cyclohexane, and other similar triarylamines. The additional charge transport molecules may, e.g., help minimize background voltage.

The charge transport layer also comprises a polymer binder resin in which the charge transport molecule(s) or component(s) is dispersed. The resin should be substantially soluble in a number of solvents, like methylene chloride or other solvent so that the charge transport layer can be coated onto the imaging member. Typical binder resins soluble in methylene chloride include polycarbonate resin, polyvinylcarbazole, polyester, polyarylate, polyacrylate, polyether, polysulfone, polystyrene, polyamide, and the like. Molecular weights of the binder resin can vary from, for example, about 20,000 to about 300,000, including about 150,000.

The charge transport layer of the present disclosure in embodiments comprises from about 25 weight percent to about 60 weight percent of the charge transport molecule(s) and from about 40 weight percent to about 75 weight percent by weight of the polymer binder resin, both by total weight of the charge transport layer. In specific embodiments, the charge transport layer comprises from about 40 weight percent to about 50 weight percent of the charge transport molecule(s) and from about 50 weight percent to about 60 weight percent of the polymer binder resin.

Generally, the thickness of the charge transport layer is from about 10 to about 100 micrometers, including from about 20 micrometers to about 60 micrometers, but thicknesses outside these ranges can also be used. In general, the ratio of the thickness of the charge transport layer to the charge generating layer is in embodiments from about 2:1 to 200:1 and in some instances from about 2:1 to about 400:1. In specific embodiments, the charge transport layer is from about 10 micrometers to about 40 micrometers thick.

The substrate provides support for all layers of the imaging member. Its thickness depends on numerous factors, including mechanical strength, flexibility, and economical considerations; the substrate for a flexible belt may, for example, be from about 50 micrometers to about 150 micrometers thick, provided there are no adverse effects on the final electrophotographic imaging device. The substrate support is not soluble in any of the solvents used in each coating layer solution, is optically transparent, and is thermally stable up to a high temperature of about 150° C. A typical substrate support is a biaxially oriented polyethylene terephthalate. Another suitable substrate material is a biaxially oriented polyethylene naphthalate, having a thermal contraction coefficient ranging from about $1\times10^{-5}/°$ C. to about $3\times10^{-5}/°$ C. and a Young's Modulus of from about $5\times10^5$ psi to about $7\times10^5$ psi. However, other polymers are suitable for use as substrate supports. The substrate support may also be made of a conductive material, such as aluminum, chromium, nickel, brass and the like. The substrate support may flexible or rigid, seamed or seamless, and have any configuration, such as a plate, drum, scroll, belt, and the like. In particular embodiments of imaging members of the present disclosure, the substrate is electrically conductive, so that a conductive layer is not present between the substrate and the undercoat layer of the present disclosure.

An optional conductive layer is present when the substrate is not itself conductive. It may vary in thickness depending on the optical transparency and flexibility desired for the electrophotographic imaging member. Accordingly, when a flexible electrophotographic imaging belt is desired, the thickness of the conductive layer may be from about 20 Angstrom units to about 750 Angstrom units, and more specifically from about 50 Angstrom units to about 200 Angstrom units for an optimum combination of electrical conductivity, flexibility and light transmission. The conductive layer may be formed on the substrate by any suitable coating technique, such as a vacuum depositing or sputtering technique. Typical metals suitable for use as the conductive layer include aluminum, zirconium, niobium, tantalum, vanadium, hafnium, titanium, nickel, stainless steel, chromium, tungsten, molybdenum, and the like.

An optional adhesive layer may be applied to the undercoat layer. Any suitable adhesive layer may be utilized. Any adhesive layer employed should be continuous and, more specifically, have a dry thickness from about 200 micrometers to about 900 micrometers and, even more specifically, from about 400 micrometers to about 700 micrometers. Any suitable solvent or solvent mixtures may be employed to form a coating solution for the adhesive layer. Typical solvents include tetrahydrofuran, toluene, methylene chloride, cyclohexanone, and the like, and mixtures thereof. Any other suitable and conventional technique may be used to mix and thereafter apply the adhesive layer coating mixture to the hole blocking layer. Typical application techniques include spraying, dip coating, roll coating, wire wound rod coating, and the like. Drying of the deposited coating may be effected by any suitable conventional technique such as oven drying, infra red radiation drying, air drying, and the like.

Any suitable charge generating layer may be applied which can thereafter be coated over with a contiguous charge transport layer. The charge generating layer generally comprises a charge generating material and a film-forming polymer binder resin. Charge generating materials such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof may be appropriate because of their sensitivity to white light. Vanadyl phthalocyanine, metal free phthalocyanine and tellurium alloys are also useful because these materials provide the additional benefit of being sensitive to infrared light. Other charge generating materials include quinacridones, dibromo anthanthrone pigments, benzimidazole perylene, substituted 2,4-diamino-triazines, polynuclear aromatic quinones, and the like. Benzimidazole perylene compositions are well known and described, for example, in U.S. Pat. No. 4,587,189, the entire disclosure thereof being incorporated herein by reference. Other suitable charge generating materials known in the art may also be utilized, if desired. The charge generating materials selected should be sensitive to activating radiation having a wavelength from about 600 to about 700 nm during the imagewise radiation exposure step in an electrophotographic imaging process to form an electrostatic latent image. In specific embodiments, the charge generating material is hydroxygallium phthalocyanine (OHGaPC) or oxytitanium phthalocyanine (TiOPC).

Any suitable inactive film forming polymeric material may be employed as the binder in the charge generating layer, including those described, for example, in U.S. Pat. No. 3,121,006, the entire disclosure thereof being incorporated herein by reference. Typical organic polymer binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, and the like.

The charge generating material can be present in the polymer binder composition in various amounts. Generally, from about 5 to about 90 percent by volume of the charge generating material is dispersed in about 10 to about 95 percent by volume of the polymer binder, and more specifically from about 20 to about 50 percent by volume of the charge generating material is dispersed in about 50 to about 80 percent by volume of the polymer binder.

The charge generating layer generally ranges in thickness of from about 0.1 micrometer to about 5 micrometers, and more specifically has a thickness of from about 0.3 micrometer to about 3 micrometers. The charge generating layer thickness is related to binder content. Higher polymer binder content compositions generally require thicker layers for charge generating. Thickness outside these ranges can be selected in order to provide sufficient charge generating.

An optional anti-curl back coating can be applied to the back side of the substrate support (which is the side opposite the side bearing the electrically active coating layers) in order to render flatness. Although the anti-curl back coating may include any electrically insulating or slightly conductive organic film forming polymer, it is usually the same polymer as used in the charge transport layer polymer binder. An anti-curl back coating from about 7 to about 30 micrometers in thickness is found to be adequately sufficient for balancing the curl and render imaging member flatness.

An electrophotographic imaging member may also include an optional ground strip layer. The ground strip layer comprises, for example, conductive particles dispersed in a film forming binder and may be applied to one edge of the photoreceptor to operatively connect charge transport layer, charge generating layer, and conductive layer for electrical continuity during electrophotographic imaging process. The ground strip layer may comprise any suitable film forming polymer binder and electrically conductive particles. The ground strip layer may have a thickness from about 7 micrometers to about 42 micrometers, and more specifically from about 14 micrometers to about 23 micrometers.

An overcoat layer, if desired, may be utilized to provide imaging member surface protection as well as improve resistance to abrasion. Overcoat layers are known in the art. Generally, they serve a function of protecting the charge transport layer from mechanical wear and exposure to chemical contaminants.

The imaging member formed may have a rigid drum configuration or a flexible belt configuration. The belt can be either seamless or seamed. In this regard, the fabricated multilayered flexible photoreceptors of the present disclosure may be cut into rectangular sheets and converted into photoreceptor belts. The two opposite edges of each photoreceptor cut sheet are then brought together by overlapping and may be joined by any suitable means including ultrasonic welding, gluing, taping, stapling, and pressure and heat fusing to form a continuous imaging member seamed belt, sleeve, or cylinder. The prepared imaging member may then be employed in any suitable and conventional electrophotographic imaging process which utilizes uniform charging prior to imagewise exposure to activating electromagnetic radiation. When the imaging surface of an electrophotographic member is uniformly charged with an electrostatic charge and imagewise exposed to activating electromagnetic radiation, conventional positive or reversal development techniques may be employed to form a marking material image on the imaging surface of the electrophotographic imaging member of this disclosure. Thus, by applying a suitable electrical bias and selecting toner having the appropriate polarity of electrical charge, one may form a toner image in the charged areas or discharged areas on the imaging surface of the electrophotographic member of the present disclosure.

The present disclosure will further be illustrated in the following non-limiting working examples, it being understood that these examples are intended to be illustrative only and that the disclosure is not intended to be limited to the materials, conditions, process parameters and the like recited herein. All proportions are by weight unless otherwise indicated.

EXAMPLES

Comparative Example 1

An undercoat layer dispersion was prepared by milling 18 grams of $TiO_2$ (MT-150W, manufactured by Tayca Co., Japan) and 12 grams of a phenolic resin dissolved in 12 grams of a solvent mixture of xylene and 1-butanol (VARCUM® 29159, OxyChem Co., phenolic resin was about 50 percent in a 50/50 mixture of xylene/1-butanol), and a total solid content of about 48 percent in an attritor mill with about 0.4 to about 0.6 millimeter size $ZrO_2$ beads for 6.5 hours, and then filtering with a 20 millimeter Nylon filter. A 30 millimeter aluminum drum substrate was then coated with the aforementioned generated dispersion using known coating techniques as illustrated herein. After drying at 160° C. for 20 minutes, an undercoat layer of $TiO_2$ in the phenolic resin ($TiO_2$/phenolic resin=60/40 w/w) about 8 microns in thickness was obtained.

A charge generating layer comprising chlorogallium phthalocyanine (Type C) was deposited on the above undercoat layer at a thickness of about 0.2 micron. The charge generating layer coating dispersion was prepared as follows. 2.7 grams of chlorogallium phthalocyanine (CIGaPc) Type C pigment were mixed with 2.3 grams of the polymeric binder (carboxyl modified vinyl copolymer, VMCH, Dow Chemical Company), 15 grams of n-butyl acetate, and 30 grams of xylene. The resulting mixture was milled in an attritor mill with about 200 grams of 1 millimeter Hi-Bea borosilicate glass beads for about 3 hours. The dispersion mixture obtained was then filtered through a 20 micron Nylon cloth filter, and the solids content of the dispersion was diluted to about 6 weight percent.

Subsequently, a 30 micron charge transport layer was coated on top of the charge generating layer from a dispersion prepared from N,N'-diphenyl-N,N-bis(3-methylphenyl)-1,1'-biphenyl-4,4'-diamine (5.38 grams), a film forming polymer binder, PCZ-400 [poly(4,4'-dihydroxy-diphenyl-1-1-cyclohexane, $M_w$=40,000)] available from Mitsubishi Gas Chemical Company, Ltd. (7.13 grams), and PTFE POLYFLON™ L-2 microparticle (1 gram), available from Daikin Industries, dissolved/dispersed in a solvent mixture of 20 grams of tetrahydrofuran (THF), and 6.7 grams of toluene through a CAVIPRO™ 300 nanomizer (Five Star Technology, Cleveland, Ohio). The charge transport layer was dried at about 120° C. for about 40 minutes.

Example 1

A photoconductor was prepared by repeating the above process of Comparative Example 1, except that 0.6 gram of acetyl tributyl citrate (UNIPLEX® 84, obtained from Unitex Chemical Corporation) was added into the undercoat layer dispersion of Comparative Example 1. A 30 millimeter aluminum drum substrate was then coated with the aforementioned generated dispersion using known coating techniques as illustrated herein. After drying at 160° C. for 20 minutes, an undercoat layer of TiO$_2$ in the phenolic resin and the citrate (TiO$_2$/phenolic resin/citrate=58.8/39.2/2 w/w/w) about 8 microns in thickness was obtained.

Example 2

A photoconductor was prepared by repeating the above process of Comparative Example 1, except that 1.5 gram of acetyl tributyl citrate (UNIPLEX® 84, obtained from Unitex Chemical Corporation) was added into the undercoat layer dispersion of Comparative Example 1. A 30 millimeter aluminum drum substrate was then coated with the aforementioned generated dispersion using known coating techniques as illustrated herein. After drying at 160° C. for 20 minutes, an undercoat layer of TiO$_2$ in the phenolic resin and the citrate (TiO$_2$/phenolic resin/citrate=57.1/38.1/4.8 w/w/w) about 8 microns in thickness was obtained.

Example 3

A photoconductor was prepared by repeating the above process of Comparative Example 1, except that 3.0 gram of acetyl tributyl citrate (UNIPLEX® 84, obtained from Unitex Chemical Corporation) was added into the undercoat layer dispersion of Comparative Example 1. A 30 millimeter aluminum drum substrate was then coated with the aforementioned generated dispersion using known coating techniques as illustrated herein. After drying at 160° C. for 20 minutes, an undercoat layer of TiO$_2$ in the phenolic resin and the citrate (TiO$_2$/phenolic resin/citrate=54.5/36.4/9.1 w/w/w) about 8 microns in thickness was obtained.

Electrical Property Testing

The above prepared photoconductors of Comparative Example 1, and Examples 1, 2 and 3 were tested in a scanner set to obtain photoinduced discharge cycles, sequenced at one charge-erase cycle followed by one charge-expose-erase cycle, wherein the light intensity was incrementally increased with cycling to produce a series of photoinduced discharge characteristic (PIDC) curves from which the photosensitivity and surface potentials at various exposure intensities were measured. Additional electrical characteristics were obtained by a series of charge-erase cycles with incrementing surface potential to generate several voltages versus charge density curves. The scanner was equipped with a scorotron set to a constant voltage charging at various surface potentials. These four photoconductors were tested at surface potentials of 700 volts with the exposure light intensity incrementally increased by regulating a series of neutral density filters; the exposure light source was a 780 nanometer light emitting diode. The xerographic simulation was completed in an environmentally controlled light tight chamber at dry conditions (10 percent relative humidity and 22° C.).

The above prepared photoconductors exhibited substantially similar PIDCs. Thus, incorporation of the citrate in the undercoat layer did not adversely affect the electrical properties of the photoconductor.

Ghosting Measurement

The Comparative Example 1 and Example 3 photoconductors were acclimated in A zone conditions (85° F. and 80 percent humidity) for 24 hours before being print tested for A zone ghosting. Print testing was accomplished in the Xerox Corporation WorkCentre™ Pro C3545 using the K (black toner) station at t=500 print counts. At the CMY stations of the color WorkCentre™ Pro C3545, run-up from t=500 print counts for the photoconductor was completed. The print for determining ghosting characteristics includes an X symbol or letter on a half tone image. When the X is invisible, the ghost level is assigned Grade 0; when X is barely visible, the ghost level is assigned Grade 1; Grade 2 to Grade 5 refers to the level of visibility of X with Grade 5 meaning a dark and visible X. Ghosting levels were visually measured against an empirical scale: the smaller the ghosting grade (absolute value), the better the print quality. A negative ghosting grade refers to a negative ghosting. The ghosting results are summarized in Table 1.

The Comparative Example 1 and Example 3 photoconductors were also acclimated in J zone conditions (70° F. and 10 percent humidity) for 24 hours before similarly print tested for J zone ghosting. The ghosting results are also summarized in Table 1. Incorporation of the citrate into the undercoat layer reduced the ghosting by about 1 grade in both A zone and J zone, which was a better print quality characteristic.

TABLE 1

| UCL composition | A zone ghosting T = 500 | J zone ghosting T = 500 |
| --- | --- | --- |
| Comparative Example 1 (no citrate) | −4 | −5+ |
| Example 3 (9.1 wt % citrate) | −3 | −4.5 |

Adhesion Testing

The adhesion for Comparative Example 1 and Examples 1, 2, and 3 between the coating layers and the substrate was tested using the following protocol. In this adhesion test, the drum was scored with a razor in a crosshatch pattern with 4-6 mm spacing. A 1" piece of tape was affixed to the device and then removed to determine the amount of delamination onto the tape. The results are included in Table 2. The scale ranges from Grade 1 to Grade 5 where Grade 1 results in almost no delamination and Grade 5 results in almost complete delamination.

TABLE 2

|  | Adhesion Grade |
| --- | --- |
| Comparative Example 1 (no citrate) | 1.5 |
| Example 1 (2 wt % citrate) | 1.5 |
| Example 2 (4.8 wt % citrate) | 1.5 |
| Example 3 (9.1 wt % citrate) | 2.0 |

Incorporation of the citrate into the undercoat layer gradually weakened the adhesion between the coating layers and the substrate. For example, adding about 9.1% of the citrate (Example 3) into the undercoat layer weakened the adhesion by about half a grade. The adhesion for Examples 1 and 2 was also weakened although the difference in the weakening effect is not shown from this specific testing method. However, the difference can be shown from the following coating layer removal test.

Example 4

The photoconductors of Comparative Example 1 and Examples 1, 2, and 3 were immersed in a solution of 80 wt % N-methyl-2-pyrrolidone (NMP), 8 wt % citric acid, and 12 wt % water at 85° C. for 3 minutes. The coating layer removal was compared with immersion time, and the immersion time was recorded in Table 3 when all the coating layers were removed from the substrate.

TABLE 3

|  | Immersion time for coating layer removal |
|---|---|
| Comparative Example 1 (no citrate) | After 5 minutes, still lots of coating layers left |
| Example 1 (2 wt % citrate) | 4 minutes |
| Example 2 (4.8 wt % citrate) | 3 minutes |
| Example 3 (9.1 wt % citrate) | 3 minutes |

Incorporation of the citrate into the undercoat layer facilitated the coating layer removal. It took about 3 to 4 minutes to completely remove the coating layers from the substrate for Examples 1, 2 and 3 (photoconductors with citrate in the undercoat layer). In contrast, after 5 minutes immersion, there were still lots of coating layers left on the substrate for the Comparative Example 1 photoconductor (no citrate in the undercoat layer).

While particular embodiments have been described, alternatives, modifications, variations, improvements, and substantial equivalents that are or may be presently unforeseen may arise to applicants or other skilled in the art. Accordingly, the appended claims as filed and as they are amended are intended to embrace all such alternatives, modifications, variations, improvements, and substantial equivalents.

The invention claimed is:

1. A method for reclaiming a substrate from an imaging member, comprising:
providing an imaging member comprising a substrate and an undercoat layer, the undercoat layer comprising a metal oxide, a polymer, and a citrate of Formula (I):

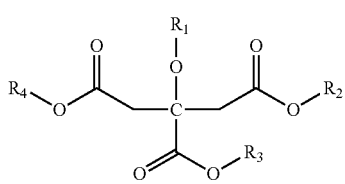

Formula (I)

wherein $R_1$ is H, alkyl, or COR'; wherein R' is alkyl; and wherein $R_2$, $R_3$, and $R_4$ are independently alkyl; and
immersing the imaging member in a stripping solution to separate the undercoat layer from the substrate.

2. The method of claim 1, wherein the stripping solution comprises a solvent selected from the group consisting of N-methylpyrrolidone, ethanol, dimethylsulfoxide, N,N'-dimethylformamide, N,N'-dimethylacetamide, and mixtures thereof.

3. The method of claim 1, wherein the stripping solution comprises an acid selected from the group consisting of citric acid, acetic acid, nitric acid, oxalic acid, phosphoric acid, hydrochloric acid, sulfuric acid, and mixtures thereof.

4. The method of claim 1, wherein the stripping solution comprises a solvent, an acid, and water.

5. The method of claim 4, wherein the stripping solution is 80 wt % N-methylpyrrolidone, 8 wt % citric acid, and 12 wt % water.

6. The method of claim 1, wherein the imaging member further comprises a charge generating layer and a charge transport layer.

7. The method of claim 1, wherein the undercoat layer comprises from about 30 to about 70 weight percent of the metal oxide; from about 30 to about 70 weight percent of the polymer; and from about 2 to about 10 weight percent of the citrate of Formula (I).

8. The method of claim 1, wherein the metal oxide is a titanium oxide or zinc oxide.

9. The method of claim 1, wherein the citrate is acetyl tributyl citrate represented by Formula (II):

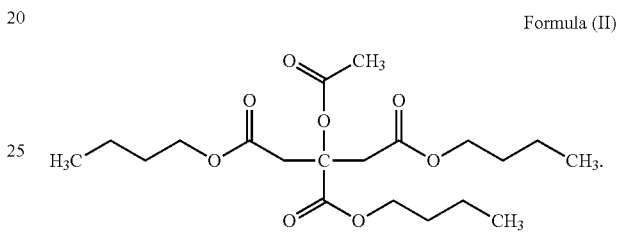

Formula (II)

10. The method of claim 1, wherein the citrate is tri(n-butyl) citrate represented by Formula (III):

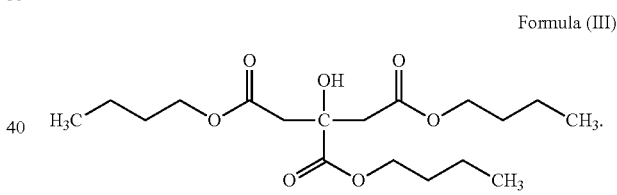

Formula (III)

11. The method of claim 1, wherein the polymer is selected from the group consisting of a phenolic resin, a melamine resin, an epoxy resin, a polyamide resin, a polyvinyl butyral resin, a polyurethane resin, a poly(vinyl carbazole), an organosilane, nylon, polyesters, polyvinylidene chloride resin, silicone resins, fluorocarbon resins, polycarbonates, polyacrylates and methacrylates, copolymers of vinyl chloride and vinyl acetate, phenoxy resins, poly(vinyl alcohol), polyacrylonitrile, polystyrene, poly(vinylbenzyl alcohol), poly(2-hydroxyethyl methacrylate), poly(2-hydroxyethyl acrylate), poly(3-hydroxypropyl methacrylate), and mixtures thereof.

12. The method of claim 1, wherein the polymer is a phenolic resin.

13. The method of claim 1, wherein the citrate comprises from about 0.1 to about 30 weight percent of the undercoat layer.

14. The method of claim 1, wherein the metal oxide is titanium dioxide, the polymer is a phenolic resin, and the citrate is acetyl tributyl citrate represented by Formula (II):

Formula (II)

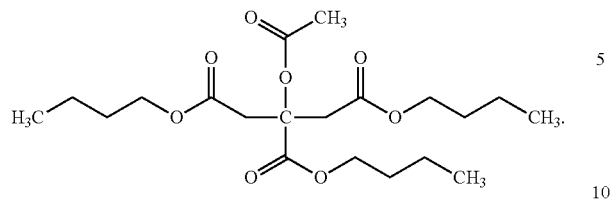

15. The method of claim 1, wherein the metal oxide is titanium dioxide, the polymer is a phenolic resin, and the citrate is tri(n-butyl) citrate represented by Formula (III):

Formula (III)

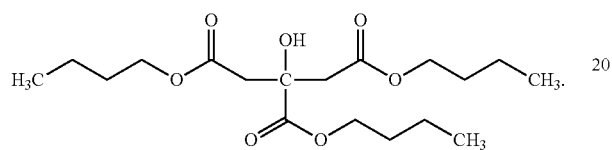

16. The method of claim 1, wherein the imaging member is immersed in the stripping solution for a period of about 3 minutes to about 5 minutes.

17. The method of claim 1, wherein any layers upon the undercoat layer are not removed prior to immersing the imaging member in the stripping solution.

\* \* \* \* \*